(12) United States Patent
Grafulla-González

(10) Patent No.: US 8,571,308 B2
(45) Date of Patent: Oct. 29, 2013

(54) IMAGE PROCESSING FOR ABERRATION CORRECTION

(75) Inventor: Beatriz Grafulla-González, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 242 days.

(21) Appl. No.: 13/063,087

(22) PCT Filed: Sep. 11, 2009

(86) PCT No.: PCT/EP2009/061791
§ 371 (c)(1),
(2), (4) Date: May 16, 2011

(87) PCT Pub. No.: WO2010/029145
PCT Pub. Date: Mar. 18, 2010

(65) Prior Publication Data
US 2011/0211752 A1    Sep. 1, 2011

Related U.S. Application Data

(60) Provisional application No. 61/097,242, filed on Sep. 16, 2008.

(30) Foreign Application Priority Data

Sep. 15, 2008 (EP) .................................... 08164333

(51) Int. Cl.
*G06K 9/00* (2006.01)
*G06K 9/40* (2006.01)
*G06K 9/38* (2006.01)

(52) U.S. Cl.
USPC ............................ 382/162; 382/275; 382/300

(58) Field of Classification Search
USPC ......... 382/162, 167, 190, 274–275, 305, 312, 382/299, 300; 348/222.1, 241, 273, 280, 348/459, 246; 345/501; 358/1.2, 518
See application file for complete search history.

(56) References Cited

U.S. PATENT DOCUMENTS 6,002,434 A    12/1999 Topper
6,404,918 B1 *  6/2002 Hel-or et al. ................... 382/167
(Continued)

FOREIGN PATENT DOCUMENTS

| EP | 1 761 072 A1 | 3/2007 |
| GB | 2 402 290 A | 12/2004 |
| JP | 2001 186533 A | 7/2001 |

OTHER PUBLICATIONS

PCT International Preliminary Report on Patentability, mailed Mar. 24, 2011, in connection with International Application No. PCT/EP2009/061791.

(Continued)

*Primary Examiner* — Kanjibhai Patel
(74) *Attorney, Agent, or Firm* — Potomac Patent Group PLLC

(57) ABSTRACT

Processing of a digital image that has been recorded through an optical system is described, the image being in a raw format matrix of picture elements and comprising a plurality of subsets of picture elements, each subset corresponding to a color component. The method comprises analyzing values of picture elements of the color components in terms of spatial features, resulting in at least one calculated parameter that is representative of aberration caused by the optical system, and performing demosaicing of the digital image by, for each picture element under consideration, defining a kernel comprising picture elements that are to be considered during the demosaicing, the definition of the kernel being dependent on the at least one parameter that is representative of the aberration.

9 Claims, 2 Drawing Sheets

(56) References Cited

U.S. PATENT DOCUMENTS

| | | | |
|---|---|---|---|
| 6,816,197 B2 * | 11/2004 | Keshet et al. | 348/273 |
| 7,221,793 B2 * | 5/2007 | Stavely et al. | 382/167 |
| 7,474,337 B1 * | 1/2009 | Cooper | 348/222.1 |
| 7,792,357 B2 * | 9/2010 | Kang | 382/167 |
| 7,822,293 B2 * | 10/2010 | Jerdev | 382/300 |
| 8,139,886 B2 * | 3/2012 | Szeliski et al. | 382/260 |
| 8,169,516 B2 * | 5/2012 | Feng et al. | 348/263 |
| 8,254,718 B2 * | 8/2012 | Bennett et al. | 382/275 |

OTHER PUBLICATIONS

PCT International Search Report, mailed Nov. 4, 2009, in connection with International Application No. PCT/EP2009/061791.

PCT Written Opinion, mailed Nov. 4, 2009, in connection with International Application No. PCT/EP2009/061791.

* cited by examiner

— 1 —
IMAGE PROCESSING FOR ABERRATION CORRECTION

CROSS REFERENCE TO RELATED APPLICATIONS

This application claims priority under 35 U.S.C. §119 to European Patent Application No. EP 08164333.0, filed on Sep. 15, 2008, which is hereby incorporated herein by reference in its entirety. This application also claims the benefit of U.S. Provisional Application No. 61/097,242, filed Sep. 16, 2008, which is hereby incorporated herein by reference in its entirety.

TECHNICAL FIELD

The present invention relates to processing a digital image recorded through an optical system, the processing involving aberration correction.

BACKGROUND

In the process of image acquisition using an optical camera (from scene to image display), the image is degraded by the atmosphere, object or camera motion, the camera system's lens, internal optics and image sensors, processing, color interpolation and further post-processing. Thus, the displayed image may look distorted, defocused, color mixed, etc. In other words, the acquired image does not seem realistic compared to that of the scene of interest.

Optical aberrations are defined as the departures of the performance of an optical system from the predictions of paraxial optics (i.e. the ideal optical approximation of the image formation). Indeed, the light wave front, assumed ideally spherical before the optical system, is modified by it, yielding an aberrated image.

Optical aberrations may be divided into two main categories: monochromatic aberrations and chromatic aberrations. Monochromatic aberrations, which occur even when the light is quasi-monochromatic, are in turn divided into those that degrade the image making it unclear and those that deform the image. On the other hand, chromatic aberrations arise from the fact that refractive index of the lens is a function of frequency or color and therefore different "colored" rays will traverse a system along different paths. The aberrations may be summarized as follows.

Monochromatic spherical aberration occurs in a spherical lens or mirror because such lenses do not focus parallel rays to a single point, but instead along the line containing the center of the lens and the focal point, decreasing the contrast and degrade the details of an image.

Monochromatic coma occurs when a ray bundle originated at an object point is oblique with regard to the lens plane. Then, different rays will focus at different positions in the object plane. In images, the effect of coma produces the so-called coma flare, i.e. the repetition of the same object at different positions and with different magnifications.

Monochromatic astigmatism is the lens aberration in which tangential and sagittal lines are focused at two different points along the optical axis. The image is clearest somewhere between these two points, though edges have a certain amount of inevitable blur.

Monochromatic field curvature corresponds to the inability to bring the centre and the border of the image into focus at the same time, with the border out of focus when the centre is sharply focused and vice-versa. This aberration is closely related to astigmatism.

Monochromatic distortion appears because the transverse magnification is a function of the distance between the image center and the pixel under consideration. In the absence of any other aberrations, images as a whole appear as misshaped, even though each point is sharply focused.

Longitudinal chromatic aberration is such that the redder (i.e. longer wavelengths) components of the white light will be focused further away from the lens than the bluer (i.e. shorter wavelengths) components. This phenomenon produces a color halo around the spot in the generated images.

Lateral chromatic aberration appears in scene points which are not in the center of the image. In this case, the magnification and focus are wavelength dependent. In an image, this will result in a different magnification of every "colored" ray and different sharpening. Succinctly, the image will consist of a continuum of more or less overlapping images, varying in size, color and focus.

In images, there may be a predominant aberration with regard to others. However, the resulting image is typically a compound of all the aberrations. It is to be noted that the aberrations described here correspond to the primary aberrations and that higher-order aberrations may also be present in an image. Nevertheless, primary aberrations are the most representative.

In the prior art, the major amount of work on aberration correction involves modification of the optical system, by adding or deleting optical devices. The principle is fairly simple. For instance, if a positive lens introduces a specific aberration (e.g. certain amount of chromatic aberration), then a negative lens introduces the inverse aberration. Therefore, if these two reciprocal lenses are combined, the aberration should be eliminated. There are, however, many other problems, since the introduction of a new lens modifies other properties of the optical system. Thus, a compromise is needed between the amount of aberration that is eliminated and the properties that are desirable in the optical system.

Correction of optical aberrations has also been done by using software-based techniques. Such techniques are in principal similar to optical corrections, i.e. recovering the ideal light wave front by modifying the wave front generated after passing through an optical system. This can be performed, for example, by using the modulation transfer function (MTF), which characterizes uniquely the optical system. This implies a-priori knowledge on the system, either by means of manufacturer data or by experimental calibration.

An example of a software-based correction can be found in U.S. Pat. No. 7,221,793 to Stavely et al. where spatially-varied demosaicing is used to correct lateral chromatic aberration. A drawback of the methods and systems described in U.S. Pat. No. 7,221,793 is that it requires some a-priori knowledge regarding the optical system.

SUMMARY

In order to improve on prior art solutions there is provided, according to a first aspect, a method of processing a digital image recorded through an optical system, the image being in a raw format matrix of picture elements and comprising a plurality of subsets of picture elements, each subset corresponding to a color component. The method comprises analyzing values of picture elements of the color components in terms of spatial features, resulting in at least one calculated parameter that is representative of aberration caused by the optical system, and performing demosaicing of the digital image by, for each picture element under consideration, defining a kernel comprising picture elements that are to be considered during the demosaicing, the definition of the kernel being dependent on the at least one parameter that is representative of the aberration.

That is, a method is provided that corrects, during demosaicing, the aberrations generated by an optical system by way of estimation, using digital processing, of the aberrations from the raw data provided by the sensor in a camera.

This is in contrast to prior art solutions where correction of aberrations is performed by means of optical elements, i.e. by means of the addition/removal of optical devices in the optical system. Such prior art solutions modify the light wave front in order to recover an aberration-free wave front. However, in present day camera equipped systems, such as mobile phones where the space is reduced, such correction of aberrations can not be performed in hardware, simply due to space restrictions.

The method also contrasts to other prior art solutions where digital image processing is performed. Specifically, since optical aberrations are optical system dependent, some sort of prior information about the optical system is needed in these prior art solutions to perform aberration correction. This information may be in the form of, for example, look-up tables provided by the manufacturer or experimental calibration of the optical system. With this prior information, the aberrations are corrected. However, where no information about the optical system is known, the present solution is at an advantage over prior art solutions because raw image data provided by the sensors is utilized in the method summarized above.

Embodiments include those where a plurality of color component images are generated by interpolating the respective subsets of picture elements corresponding to a color component, and wherein the analysis of values of picture elements comprises analyzing values of picture elements of the color component images.

The analysis of values of picture elements in terms of spatial features may comprise any of edge detection and image segmentation.

Moreover, the analysis of values of picture elements in terms of spatial features may comprise comparing values of picture elements between color component images by utilizing an image registration technique.

The definition of the kernel may comprise calculation of at least a size of the kernel, a distance and direction of displacement of the kernel in relation to the picture element under consideration.

A demosaicing map may be calculated that comprises kernel data in relation to all picture elements of the raw image and the calculated demosaicing map may then be utilized during the demosaicing.

That is, a demosaicing map may be created, in which each location, corresponding to a pixel of the image to be analyzed, contains the information for each color kernel employed in the demosaicing function. This information may comprise three parameters: (1) the distance of the kernel from the pixel under consideration, (2) the direction in which the kernel has to be moved from the pixel under consideration, and (3) the size of the kernel. With this information, the demosaicing function, as a linear interpolation, may be performed on the raw image data and a final, aberration-free, image may be obtained.

In a second aspect, there is provided a communication terminal comprising an optical system, an image sensor and image processing circuitry configured to perform the method as summarized above. A computer program according to a third aspect may comprise software instructions that, when executed in a computer, performs the method according to the first aspect. These further aspects provide corresponding effects and advantages as discussed above in connection with the first aspect.

BRIEF DESCRIPTION OF THE DRAWINGS

Embodiments will now be described with reference to the attached drawings, where.

DETAILED DESCRIPTION OF EMBODIMENTS

Figure 1:
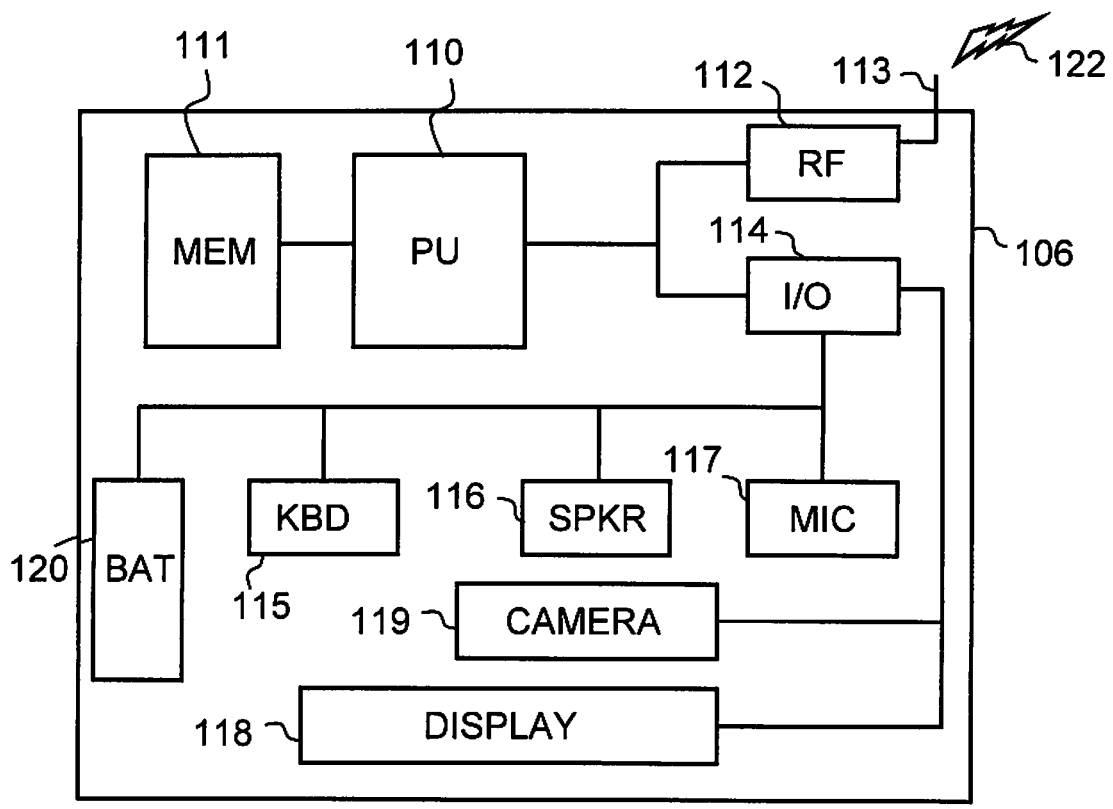
FIG. 1 is a functional block diagram that schematically illustrates mobile communication device.

FIG. 1 illustrates schematically an arrangement in which image processing as summarized above may be realized. The arrangement is in FIG. 1 exemplified by a mobile communication device 106, e.g. a mobile phone. The communication device 106 comprises a processor 110, memory 111, a battery 120 as well as input/output units in the form of a microphone 117, a speaker 116, a display 118, a camera 119 and a keypad 115 connected to the processor 110 and memory 111 via an input/output interface unit 114. Radio communication via an air interface 122 is realized by radio circuitry (RF) 112 and an antenna 113. The processor 110 makes use of software instructions stored in the memory 111 in order to control, in conjunction with logic circuitry incorporated in the processor 110 as well as in other parts of the device 106, all functions of the device 106. The battery 120 provides electric power to all other units that reside in the mobile communication device 106. Details regarding how these units operate in order to perform normal functions within a mobile communication network are known to the skilled person and are therefore not discussed further. Moreover, the illustration of a mobile communication device with a camera is not to be interpreted as limiting. That is, realization of the image processing summarized above is only one example and it is foreseen that it is useful in any device that has processing capabilities and where image processing is an issue.

Figure 2:
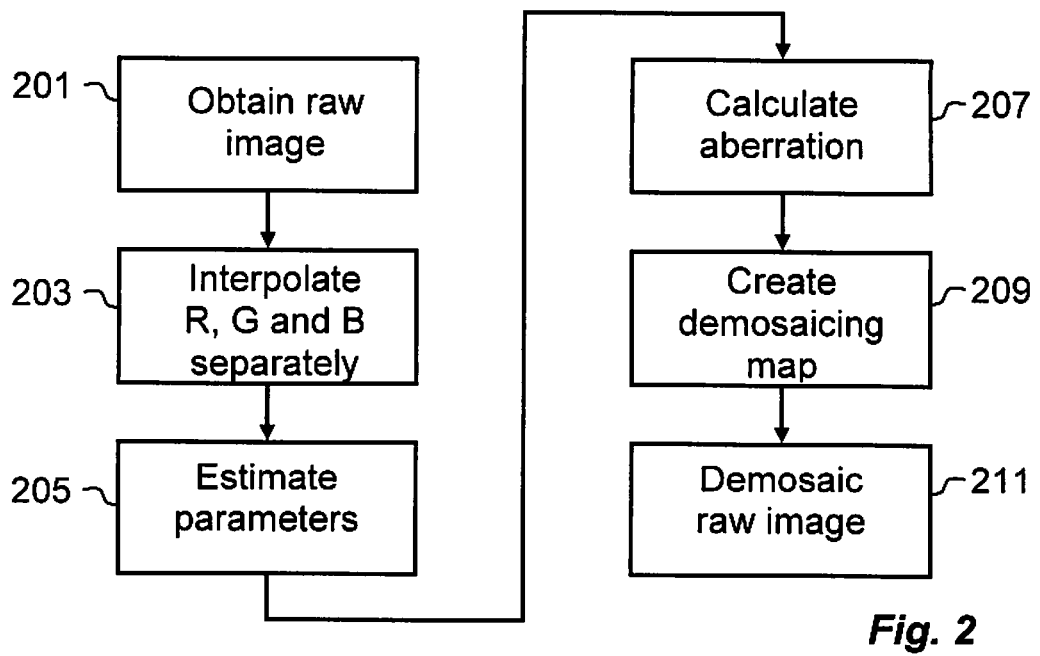
FIG. 2 is a flow chart of image processing, and FIG. 3 schematically illustrates a demosaicing map.

Now with reference to FIGS. 2 and 3, a method will be described that corrects aberration in an image that has been recorded with a camera such as the camera 119 in the device of FIG. 1. Needless to say, the camera comprises an optical system and a sensor, as is known in the art.

The method starts with an obtaining step 201 where a raw image from a camera sensor is obtained. The raw image has not been pre-processed, the color components are not calibrated, i.e. no white balancing has been performed, and the pixel representation corresponds, e.g., to the Bayer pattern that is well known in the art. This pattern represents an incomplete image, as only one piece of color information is captured per pixel, and since the raw image is not processed in any way, optical aberrations are clearly manifested in the raw image.

The R, G, B components of the captured raw image correspond to image representations of three different wavelengths. This implies that these three components can be treated independently as three different images. But, because it is a Bayer pattern, these images are incomplete. Hence, in an interpolation step 203, separate interpolation of the three color channels is performed in order to obtain three different images. Any suitable interpolation technique is possible. For example linear, polynomial, spline, etc. interpolation can be used. It should be noted that, although use of completed images created by interpolation of the component images is advantageous, it is possible to use the incomplete components.

Then a step of parameter estimation 205 follows. Since each R, G and B image component corresponds to a different wavelength, the parameters of the optical system for each "colored" ray will also be different in terms of, for instance, focal length, magnification, refractive index, etc. As a consequence, the amount of monochromatic aberrations for each image component will be different, especially in terms of distortion and blurring (caused by the astigmatism, coma, spherical aberration and defocus as discussed above). The addition of the three separate images is what generates the chromatic aberrations.

In order to correct the optical aberrations, these are estimated from the three separately interpolated images. This correction is mainly carried out using two complementary parameters: the amount of edge displacement between color components (for the correction of the distortion) and the amount of image blur (for the correction of chromatic aberration, astigmatism and spherical aberration).

To estimate these parameters, both edge detector and image segmentation are needed. The first is in order to determine the edge displacement between color channels. The second helps in measuring the amount of image blur, since the size of objects is different in each color channel. These calculations are performed in the parameter estimation 205. The edge detection can be performed with any suitable edge detection algorithm known in the art, such as Canny filter or Fourier descriptors, but, again, any technique can be employed in this case. For image segmentation, many algorithms exist in the art, e.g. K-means algorithm, EM segmentation, neural networks, genetic algorithms, MCMC, etc. Again, any image segmentation method can be employed.

Then, in a calculation step 207, the result of the edge detection and image segmentation is used to estimate the values of edge displacement and the amount of blur in the obtained image. This is performed by comparing the results of each color component using registration techniques, for example measuring the mutual information between color channels. However, any other registration technique can also be used.

Now that the parameters regarding the estimation of optical aberrations are calculated, a concept is introduced, in a creation step 209, that will be referred to as a demosaicing map. The demosaicing map links the optical aberrations with the final stage of the method, the demosaicing function, since the information contained in the map describes how to perform the demosaicing according the amount of optical aberrations in the image. The demosaicing map is defined as a matrix whose size is the same as the image to be corrected, i.e. the obtained image. Knowing that the subsequent demosaicing is to be performed linearly, a triplet is defined for each matrix cell of the demosaicing map. Each triplet component contains information regarding the color kernels to be used in the demosaicing function. This information is in turn divided into other three parameters, which correspond to:

the distance from the pixel under consideration to the position of the kernel,
the direction of the kernel movement from the pixel under consideration, and
the size of the kernel, in order to avoid considering pixels belonging to different objects.

In other words, the three color components of the raw image can be treated as three independent monochromatic images, as the image formation for each color component has been performed with different optical parameters (e.g. different focal lengths, magnifications, refractive indexes, etc.). This implies that a scene will have three different monochromatic representations in terms of size, object location etc. in the raw image. With the subsequent image segmentation, edge detection and image registration, it is possible to quantify how much each color component has been shifted with regard to each other or with regard to some reference component (e.g. the green component having a centre wavelength between those of the red and blue. However, the reference component may be any color component or even a different reference image). Thanks to this quantification, it is then possible to determine, for each pixel, the direction of each color kernel displacement and the corresponding distance from the pixel under consideration. The image segmentation and the edge detection provide further information on the color kernels, since they enable determination of their size. In this sense, only related pixel-content information is included in the pixels used by the kernel to perform the demosaicing operation, i.e. if for example the kernel is too big and includes several objects, it will be decreased so that reliable information is used during the demosaicing.

Figure 3:
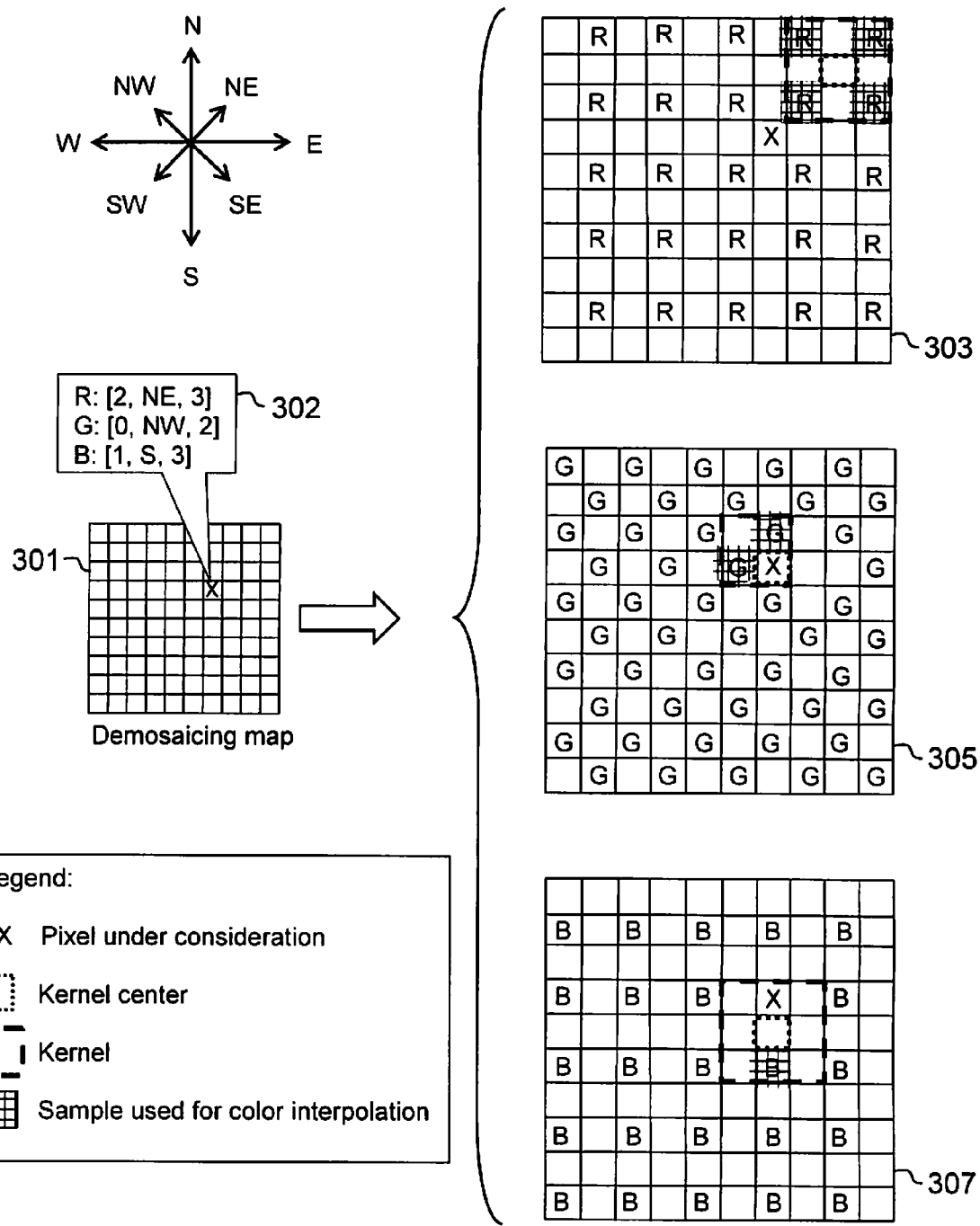

In FIG. 3 the demosaicing map 301 is illustrated as a 10×10 matrix in which "X" shows a pixel under consideration and an associated kernel triplet 302. The information contained in the triplet 302 is illustrated for the R component 303, the G component 305 and the B component 307. For the R component 303, the kernel information states that the center (dotted line) of the kernel (dashed line) is located two pixels to the north east of the pixel under consideration, and that the size of the kernel is 3 by 3 pixels. A hash pattern identifies the sample pixels to be used in the ensuing demosaicing step 211.

The information contained in the triplet 302 for the G component 305 states that the center (dotted line) of the kernel (dashed line) is located zero pixels to the north west of the pixel under consideration, and that the size of the kernel is 2 by 2 pixels. A hash pattern identifies the sample pixels to be used in the ensuing demosaicing step 211.

The information contained in the triplet 302 for the B component 307 states that the center (dotted line) of the kernel (dashed line) is located one pixel to the south of the pixel under consideration, and that the size of the kernel is 3 by 3 pixels. A hash pattern identifies the sample pixels to be used in the ensuing demosaicing step 211.

The final stage, the demosaicing step 211, performs the linear interpolation of the missing pixels in the raw image according to the information provided by the demosaicing map 301. It should be noted that, due to the general nature of this invention, all the other types of demosaicing algorithms can be employed, for example constant hue interpolation, color correlation, edge-adaptive, Kimmel algorithm, etc.

The result is an aberration-corrected, complete, RGB image that may be used for storage, display or any other further processing, such as computer vision algorithms.

To summarize, an advantage of the method described above (and any corresponding apparatus and/or software component that has been configured to perform the method) is that it is optical system independent, and therefore, no prior information about the optical system is needed. This is of particular interest for devices where the camera module is unknown, which is the case, for example, of providers of mobile phone platforms. Typically, mobile platform providers do not have control over the manufacture of the optical systems comprised in a camera unit to the extent that parameters describing the aberration are unknown.

Another advantage is that it is possible to correct a plurality of optical aberrations at the same time. Furthermore, in the demosaicing function, edges are preserved since the position and size of the interpolation kernels are also taken under consideration.

The method may advantageously be realized wholly in software. In such a case it is possible to implement the method in any imaging device which suffers from optical aberrations and which contains memory and a processor core (e.g. CPU, GPU). These devices may be, for example, a mobile phone, a PDA, a compact photographic camera, etc.

The invention claimed is:

1. A method of processing a digital image recorded through an optical system, the image being in a raw format matrix of picture elements and comprising a plurality of subsets of picture elements, each subset corresponding to a color component, the method comprising:

analyzing values of picture elements of the color components of the digital image in terms of spatial features, resulting in at least one calculated parameter that is representative of aberration caused by the optical system; and performing demosaicing of the digital image by, for each picture element under consideration, defining a kernel comprising picture elements that are to be considered during the demosaicing, the definition of the kernel being dependent on the at least one parameter that is representative of the aberration.

2. The method of claim 1, comprising:

generating a plurality of color component images by interpolating the respective subsets of picture elements corresponding to a color component, and wherein:

the analysis of values of picture elements comprises analyzing values of picture elements of the color component images.

3. The method of claim 1, wherein the analysis of values of picture elements in terms of spatial features comprises any of edge detection and image segmentation.

4. The method of claim 1, wherein the analysis of values of picture elements in terms of spatial features comprises comparing values of picture elements between color component images by utilizing an image registration technique.

5. The method of claim 1, wherein the definition of the kernel comprises calculation of at least a size of the kernel, a distance and direction of displacement of the kernel in relation to the picture element under consideration.

6. The method of claim 1, comprising calculating a demosaicing map comprising kernel data in relation to all picture elements of the raw image, and utilizing the calculated demosaicing map during the demosaicing.

7. A communication terminal comprising an optical system, an image sensor and image processing circuitry configured to perform a method of processing a digital image recorded through the optical system, the image being in a raw format matrix of picture elements and comprising a plurality of subsets of picture elements, each subset corresponding to a color component, the method comprising:

analyzing values of picture elements of the color components of the digital image in terms of spatial features, resulting in at least one calculated parameter that is representative of aberration caused by the optical system; and performing demosaicing of the digital image by, for each picture element under consideration, defining a kernel comprising picture elements that are to be considered during the demosaicing, the definition of the kernel being dependent on the at least one parameter that is representative of the aberration.

8. The communication terminal of claim 7, comprising a Bayer arrangement of color filters arranged at the image sensor.

9. A non-transitory computer readable medium having stored therein software instructions that, when executed in a processor, causes the processor to perform a method of processing a digital image recorded through an optical system, the image being in a raw format matrix of picture elements and comprising a plurality of subsets of picture elements, each subset corresponding to a color component, the method comprising:

analyzing values of picture elements of the color components of the digital image in terms of spatial features, resulting in at least one calculated parameter that is representative of aberration caused by the optical system; and performing demosaicing of the digital image by, for each picture element under consideration, defining a kernel comprising picture elements that are to be considered during the demosaicing, the definition of the kernel being dependent on the at least one parameter that is representative of the aberration.

* * * * *